M. A. TWITCHELL.
LOCK WASHER.
APPLICATION FILED JULY 26, 1916.

1,238,962.

Patented Sept. 4, 1917.

Inventor
M. A. TWITCHELL

Milton S. Crandall,
Attorney

UNITED STATES PATENT OFFICE.

MYRON A. TWITCHELL, OF ELK POINT, SOUTH DAKOTA, ASSIGNOR OF ONE-HALF TO CLARENCE A. GREEN, OF SIOUX CITY, IOWA.

LOCK-WASHER.

1,238,962.   Specification of Letters Patent.   Patented Sept. 4, 1917.

Application filed July 26, 1916. Serial No. 111,358.

*To all whom it may concern:*

Be it known that I, MYRON A. TWITCHELL, a citizen of the United States, and a resident of Elk Point, in the county of Union and State of South Dakota, have invented certain new and useful Improvements in Lock-Washers, of which the following is a specification.

The present invention relates to means for preventing loosening of nuts and bolts.

The familiar split spring washers, commonly used for preventing the loosening of nuts and bolts, are undependable for the reason that their tension on the face of the bolt is not uniform and furthermore they do not prevent relative movement between the bolt and washer.

The present invention, therefore, has for its primary object the production of an improved spring washer having a uniform tension on the face of the nut and embodying means for preventing relative rotation between the washer and bolt.

Another object of the invention is the production of an improved spring washer, inexpensive in production and thoroughly efficient in operation.

Still another object of the invention is the production of improved, positive means for locking nuts upon bolts and still permit the ready removal of the nuts from the bolts when desired, without injury to either the nuts or bolts.

With these and other objects in view, the invention, consisting in the construction, combination and novel arrangement of parts, will be fully understood from the following description, reference being had to the accompanying drawings which form a part of this application, and of which,—

Figure 1:
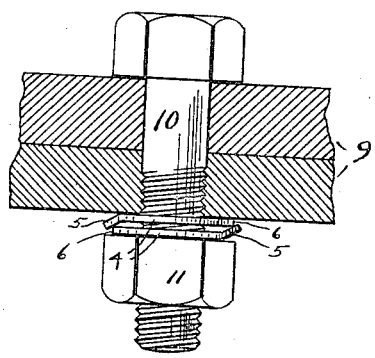
Figure 2:
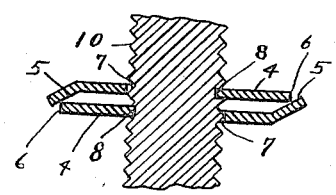
Figure 4:
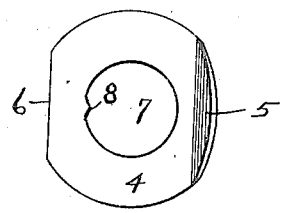
Figure 3:
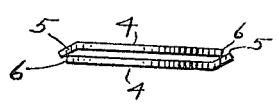

Figure 1 is a section of two members interconnected by a bolt and nut having the device of my invention applied thereto; Fig. 2 is an enlarged vertical section of the bolt and washers; Fig. 3 is a side elevation of the washer; and Fig. 4 is a plan of one of the washers.

Although I have illustrated and described the preferred form of the invention, I would not be understood as being limited to the specific structure chosen for illustration, for various alterations and modifications in the details of construction and arrangement of parts, may be made without departing from the spirit and scope of the invention as defined in the appended claims.

Referring, now, to the illustrations, the preferred form of the invention embodies a pair of washers, each including a blank, 4, of spring metal and having an inclined edge portion, 5, and a flat side, 6, opposite the inclined portion. The washers are provided with the usual center opening, 7, and the edge of the blank adjacent the side of the opening opposite the said portion is provided with a tooth, or inwardly extending stud, 8.

Referring to Figs. 1 and 2, 9 represents two bodies through which a bolt, 10, is extended. The washers are interposed between the nut, 11 and the adjacent body and are so assembled that the flat side of each bears against the inclined portion of the other.

When the nut is turned into firm engagement with the adjacent washer, the washers will be forced toward each other, and, by coöperation of the flat side of each with the inclined portion of the other, the washers will be forced laterally in opposite directions, thereby forcing the teeth into firm engagement with the bolt.

It is now evident that the washers, when thus constructed and applied, positively prevent relative rotation between the bolt and washers, and that their substantially uniform spring pressure against the body and nut, effectually prevents accidental loosening of the nut.

The nut however, may readily be loosened by a wrench.

Having thus described my invention, what I claim as new and desire to secure by Letters Patent of the United States, is,—

1. In a nut-lock, a blank of spring material having a central opening, an inclined side portion, a flat side portion opposite the inclined portion, and an inwardly extending projection at the side of the opening opposite the inclined portion.

2. The combination with a bolt and nut of a pair of washers encircling the bolt and each having an inclined surface adjacent one side, the washers being oppositely faced and the inclined surface of each being engaged by the side of the other opposite its inclined surface.

3. The combination with a bolt and nut of a pair of washers encircling the bolt, each washer having an inclined surface adjacent one side, and a flat side opposite the inclined surface, the washers being oppositely faced and the inclined surface of each engaged by the flat side of the other.

4. The combination with a bolt and nut of a pair of washers encircling the bolt, each washer having an inclined surface adjacent one side, a flat side adjacent the inclined surface and an inwardly-extending projection on the side of the opening opposite the inclined surface, the washers being oppositely faced and the inclined surface of each engaged by the flat side of the other.

5. A lock-washer for a bolt and nut comprising two individual washers, each having an inclined surface adjacent one side, a flat side opposite the inclined surface, and an inwardly-extending projection on the side of the opening opposite the inclined surface, the washers being adapted to be placed on the bolt under the nut, and oppositely faced, with the flat side of each in contact with the inclined surface of the other, whereby the washers will be forced laterally in opposite directions when compressed by the nut.

In testimony whereof, I have hereunto set my hand this 5th day of July, 1916.

MYRON A. TWITCHELL.

Copies of this patent may be obtained for five cents each, by addressing the "Commissioner of Patents, Washington, D. C."